Aug. 20, 1940.    D. W. HUDSON    2,212,267
TIRE CHAIN TOOL
Filed March 28, 1938
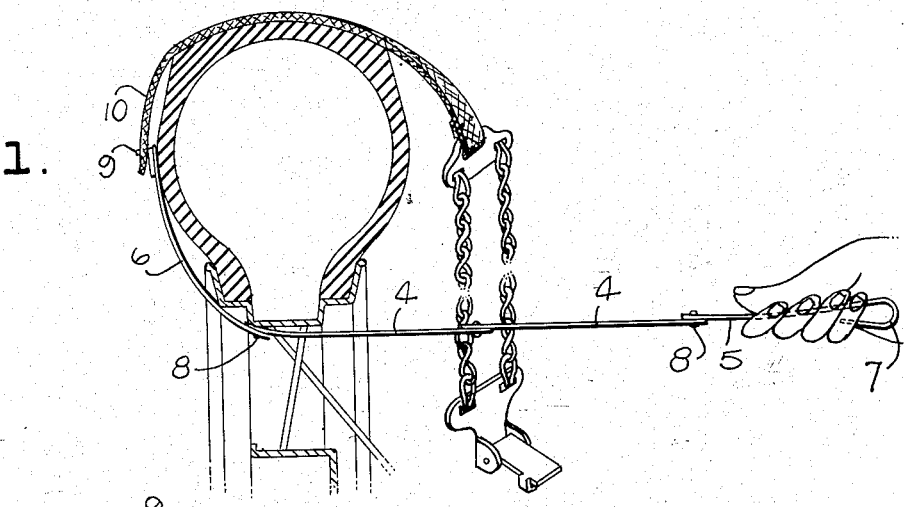
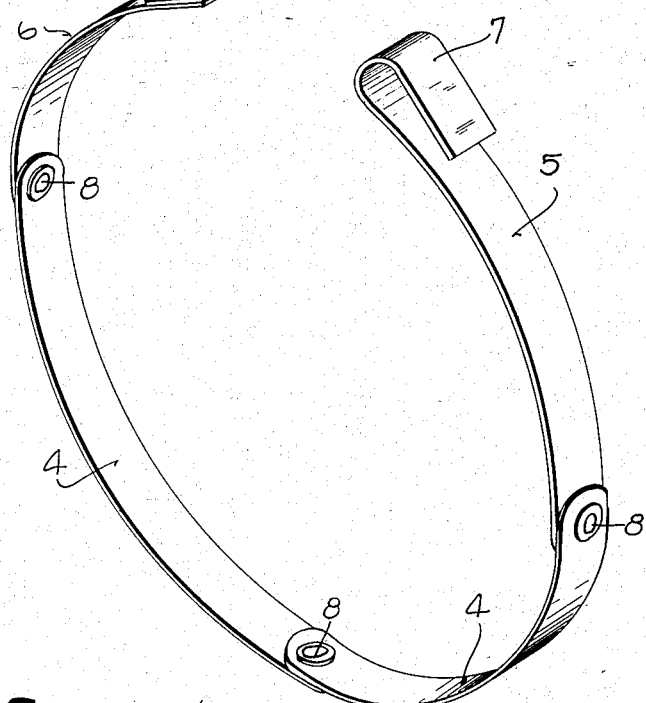
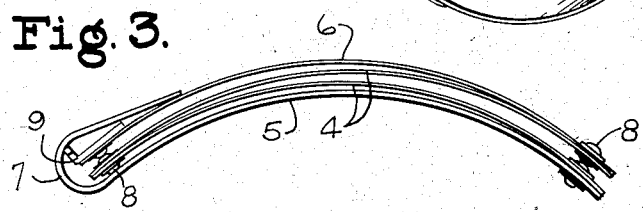
INVENTOR
DAVID W. HUDSON
BY
Wheeler, Wheeler & Wheeler
ATTORNEYS Patented Aug. 20, 1940

2,212,267

UNITED STATES PATENT OFFICE 2,212,267

TIRE CHAIN TOOL

David W. Hudson, Green Bay, Wis.

Application March 28, 1938, Serial No. 198,366

2 Claims. (Cl. 81—15.8)

This invention relates to improvements in tire chain tools.

The type of tool to which this invention relates is a tool for facilitating the application of a tire chain about the casing, the rim, and the felloe of an automobile wheel. In the past such devices have been bulky and awkward to store in or about the car, and it is the primary object of the present invention to provide a simple inexpensive device foldable to a compact form and, preferably, provided with a handle which constitutes means for maintaining the collapsed tool in its desired folded position.

In the drawing:

Figure 1 shows my improved device in use in the application of a chain, the device being shown in side elevation and the automobile wheel parts in section.

Figure 2 is a view in perspective showing the device in its normal position extended for use.

Figure 3 is a side elevation of the device folded for storage.

Like parts are identified by the same reference characters throughout the several views.

The tool comprises arcuate sections 4, 5 and 6 to a number sufficient to extend almost entirely around the felloe and tire of an automobile wheel. Section 5 may desirably be made of relatively heavy stock and reversely folded upon itself at 7 to constitute a hook. This section of the device serves as a handle for the manipulation of the tool and the hook serves as a retaining means within which other portions of the tool are stored as will hereinafter be described.

Sections 4 of the device may be made of lighter material similar to clock spring material. Such resilient band material is preferred to wires because the tool is more easily manipulated and assembled when band spring stock is used. Rivets are employed at 8 for the pivotal connection of the several sections of the tool.

The section 6 may be identical with sections 4 except for the provision at its end of a hook 9 for engagement with the strap portion 10 of the tire chain. Any other coupling device for temporary connection with the tire chain strap may be used.

The tool may readily be folded by simply pivoting the several sections to and fro upon their connecting rivets 8 until all of the sections are superposed. In superposing sections 4 and 6 upon the handle section 5, the ends and the hook 9 or other coupling device will be engaged beneath the retainer 7 of the handle 5, there being sufficient distortion of the sections involved in this operation so that the retainer 7 will frictionally hold the parts in their nested relation.

For use the several sections are unfolded into positions of arcuate alignment as shown in Fig. 2. The friction between the sections at the points where they are connected by the rivets will be sufficient to hold the parts frictionally in these relative positions. Thereupon the coupler 9 is thrust beneath the felloe and the bias of the several sections will cause it to follow arcuately about the tire as the tool is progressively fed between the spokes of the wheel. As soon as the coupler 9 is exposed at the top of the tire, the strap portion 10 of the tire chain is temporarily connected therewith and the tool is then withdrawn. Due to the high degree of flexibility of the material used, the operator can simply pull in any desired direction upon the handle, the intermediate portion of the tool straightening itself out when taut as shown in Fig. 1, thus eliminating any need for carefully feeding the tool backwardly about the casing.

I claim:

1. A tire chain tool comprising the combination with a first member constituting a handle and having a retainer portion, of a series of extension members projecting end to end beyond said handle, each of said extension members being biased to assume a normally arcuate form and said extension members and handle member having their contiguous end portions pivotally connected for movement on axes substantially radial with respect to the arcuate form of said members, whereby the several members may be collapsed for nesting and from each other, said handle member comprising a hook portion within which the several remaining members are engageable when nested, and one of said extension members remote from said handle member having a tire chain coupling.

2. The tire chain tool of claim 1 wherein the coupling member is T-shaped, comprising an upstanding portion and a head carried thereby transversely of the extension member upon which it is mounted.

DAVID W. HUDSON.